United States Patent
Yoshida et al.

(10) Patent No.: US 8,680,422 B2
(45) Date of Patent: Mar. 25, 2014

(54) WIRE ELECTRICAL DISCHARGE MACHINE THAT ADJUSTS FLOW RATE OF WORKING FLUID BASED ON MACHINING STATE

(75) Inventors: Masayuki Yoshida, Yamanashi (JP); Akiyoshi Kawahara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 26 days.

(21) Appl. No.: 13/525,501

(22) Filed: Jun. 18, 2012

(65) Prior Publication Data

US 2013/0092661 A1   Apr. 18, 2013

(30) Foreign Application Priority Data

Oct. 13, 2011   (JP) ................... 2011-226001

(51) Int. Cl.
*B23H 1/10*   (2006.01)
*B23H 7/02*   (2006.01)
*B23H 7/10*   (2006.01)

(52) U.S. Cl.
CPC ................... *B23H 7/101* (2013.01)
USPC ................... 219/69.12; 219/69.14

(58) Field of Classification Search
USPC .......... 219/69.12, 69.14, 69.13, 69.16, 69.18; 700/162
See application file for complete search history.

(56) References Cited

U.S. PATENT DOCUMENTS

| | | |
|---|---|---|
| 3,705,286 A | 12/1972 | Kondo et al. |
| 4,045,663 A | 8/1977 | Young |
| 4,581,513 A | 4/1986 | Obara et al. |
| 4,582,974 A | 4/1986 | Itoh |
| 5,085,247 A * | 2/1992 | Higashi ............... 219/69.12 |
| 5,122,630 A * | 6/1992 | Reynier et al. ....... 219/69.12 |
| 5,306,888 A | 4/1994 | Kaneko et al. |
| 5,744,775 A | 4/1998 | Yasuda et al. |
| 7,638,726 B2 * | 12/2009 | Hashimoto et al. .... 219/69.12 |

FOREIGN PATENT DOCUMENTS

| | | | |
|---|---|---|---|
| EP | 2269755 A2 | | 1/2011 |
| JP | 63-102831 A | * | 5/1988 |
| JP | 63102830 A | | 5/1988 |
| JP | 63102831 A | | 5/1988 |
| JP | 3111121 A | | 5/1991 |
| JP | 4261713 A | | 9/1992 |
| JP | 639645 A | | 2/1994 |

(Continued)

OTHER PUBLICATIONS

Japanese Office Action for Application No. 13/525,501 mailed Nov. 27, 2012.

(Continued)

*Primary Examiner* — Geoffrey S Evans
(74) *Attorney, Agent, or Firm* — Lowe Hauptman & Ham, LLP (57) ABSTRACT

In a discharge pulse current introduced into a machining gap between a wire electrode and a workpiece, ineffective discharge pulses not contributing to machining are discriminated and the number of the ineffective discharge pulses is counted. Moreover, an electrical discharge position is detected. An unevenly distributed state of machining chips in the machining gap is discriminated based on the counted number of the ineffective discharge pulses and the detected electrical discharge position. In order to eliminate the unevenly distributed state of the machining chips based on the unevenly distributed state of the machining chips, a flow rate of a working fluid supplied from an upper working fluid feeder in an upper wire guide and a flow rate of a working fluid supplied from a lower working fluid feeder in a lower wire guide are adjusted.

4 Claims, 4 Drawing Sheets

(56) References Cited

FOREIGN PATENT DOCUMENTS

| | | | |
|---|---|---|---|
| JP | 7060548 | A | 3/1995 |
| JP | 2010280046 | A | 12/2010 |
| WO | 9301017 | A | 1/1993 |

OTHER PUBLICATIONS

European Search Report Corresponding to EP12172964.4, dated Jan. 25, 2013.

* cited by examiner

WIRE ELECTRICAL DISCHARGE MACHINE THAT ADJUSTS FLOW RATE OF WORKING FLUID BASED ON MACHINING STATE

RELATED APPLICATIONS

The present application is based on, and claims priority from, Japanese Application Number 2011-226001, filed Oct. 13, 2011, the disclosure of which is hereby incorporated by reference herein in its entirety.

BACKGROUND OF THE INVENTION

1. Field of the Invention

The present invention relates to a wire electrical discharge machine that adjusts the amount of a working fluid based on the machining state.

2. Description of Related Art

In a wire electrical discharge machine, a voltage is applied to a machining gap between a wire electrode and a workpiece so that an electrical discharge occurs, and at the same time relative positions of the wire electrode with respect to the workpiece are changed with use of servo motors. Under such a condition, while a working fluid is being supplied to the machining gap, the workpiece is machined into a desired shape.

It is well-known that there is a correlation between a voltage (machining gap voltage) applied to the machining gap and a size (or length) of the machining gap. Therefore, controlling the machining gap voltage to be constant can lead to highly precise machining and it may result in the workpiece with a uniform machined surface.

However, the machining gap voltage might not represent an accurate size of the machining gap between the wire electrode and the workpiece when the machining state in the machining gap is unstable.

Figure 1:
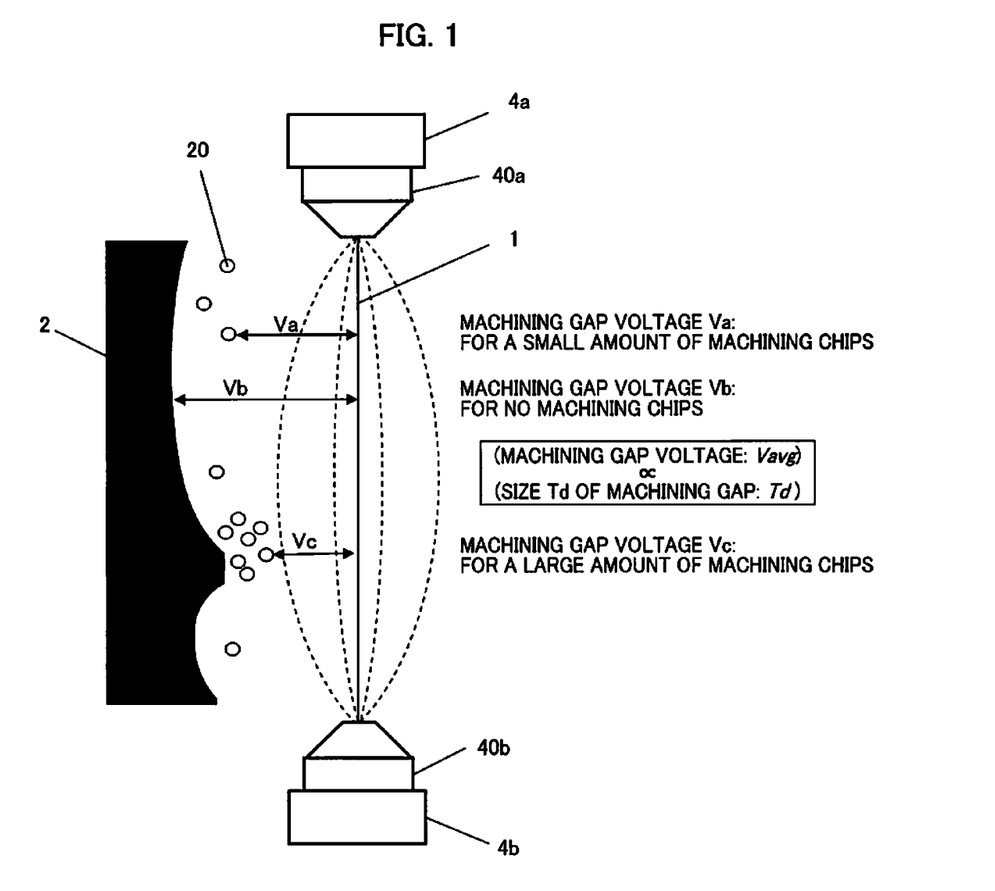
FIG. 1 is a diagram for describing a model of machining states in a machining gap between a wire electrode and a workpiece.

FIG. 1 illustrates a model of machining states in a machining gap. A voltage Vavg (machining gap voltage) applied to a machining gap between a wire electrode 1 and a workpiece 2 has the correlation shown in the following Expression 1 with respect to a size Td of the machining gap.

$$\text{Vavg} \propto \text{Td} \quad (1)$$

However, the machining gap voltage Vavg does not represent the accurate size of the machining gap between the wire electrode 1 and the workpiece 2 when the machining gap is in an unstable state, that is, in a state in which machining chips 20 are unevenly distributed. When a board thickness of the workpiece 2 is large, supply of the working fluid to the workpiece 2 is poor and moreover an influence of the vibration and flexure of the wire electrode 1 increases. This results in locally concentrated electrical discharges, and is considered the cause of the uneven distribution of the machining chips 20 as illustrated in FIG. 1. In this case, a machining gap voltage Va with a small amount of the machining chips 20, a machining gap voltage Vb with no machining chips 20, and a machining gap voltage Vc with a large amount of the machining chips 20 differ from each other, so that, under this condition, it is difficult to determine the accurate size Td of the machining gap between the wire electrode 1 and the workpiece 2 from the voltage Vavg (average value). Moreover, the machining gap voltage Vavg can be obtained by measuring a voltage between the wire electrode 1 and the workpiece 2. Well-known wire electrical discharge machines are usually equipped with means for measuring the machining gap voltage Vavg.

Factors that cause the unstable machining state include poor exhaustion of the machining chips 20 and poor supply of the working fluid. In general, the machining state tends to become unstable especially when the board thickness of the workpiece 2 is large because the working fluid is supplied to the workpiece 2 from both an upper working fluid feeder 40a and a lower working fluid feeder 40b. When the board thickness of the workpiece 2 is large, it is clear that the supply of the working fluid to the center of the workpiece is poor, and moreover the influence of the vibration and flexure of the wire electrode 1 increases. This results in locally concentrated electrical discharges. As a result, the machining chips 20 are considered to be unevenly distributed between the wire electrode 1 and the workpiece 2 in a direction in which the wire electrode 1 travels. Moreover, the wire electrode 1 travels from an upper wire guide 4a toward a lower wire guide 4b during the machining of the workpiece 2.

Japanese Patent Application Laid-Open (JP-A) No. 3-111121 and JP-A No. 7-60548 disclose a method of obtaining electrical discharge positions from current values or voltage values on conduction paths, and changing and controlling machining conditions, by recognizing a machining area from the distribution of the electrical discharge positions that are obtained. However, the method disclosed in these patent literatures attempts to avoid a concentrated electrical discharge attributable to uneven distribution of machining chips, in recognition of uneven distribution of discharge positions as the uneven distribution of machining chips. Therefore, there is a possibility that an excessive adjustment is carried out when the machining conditions are adjusted in a state in which the machining state has changed. For instance, in a state in which unmachined portions of the workpiece are unevenly distributed, the discharge positions are also unevenly distributed. However, there is no existing technology to determine whether the electrical discharge contributes to the machining of the workpiece. Furthermore, if the machining conditions are unnecessarily adjusted when normal electrical discharges are carried out, such an adjustment may impair normal electrical discharge machining.

JP-A No. 2010-280046 discloses the followings: the machining state is classified into "open", "leak", "electrical discharge", "immediate electrical discharge", and "short-circuit"; reference values which are set beforehand and state determination data are compared; and a feeding rate of wire, rest time, a flow rate of working fluid, and an application voltage are changed in accordance with the comparison result. This patent literature also discloses that supply of the working fluid is increased to promote exhaust of the machining chips because, when the state "leak" is dominant, it is highly assumed that the machining chips remain. In this technology, the exhaust of the remaining machining chips can be promoted by determining the machining state. However, the machining conditions can be more appropriately adjusted if the following is determined: at which part of the machining gap between the wire electrode and the workpiece, the determined machining state appears, and at which position the machining chips exist. Accordingly, regarding this technology, there is still room for improvement in the above-mentioned point of view.

JP-A No. 4-261713 discloses a method of independently controlling pumps that supply a working fluid to an upper nozzle and a lower nozzle, respectively so that a pressure value of the working fluid can follow a pressure value of the working fluid which has been instructed beforehand. In the method disclosed in this patent literature, in order to appropriately exhaust machining chips, it is necessary to recognize the uneven distribution of the machining chips and adjust the flow rate or the pressure of the working fluid.

SUMMARY OF THE INVENTION

Accordingly, in view of the above-mentioned problems of the related art, an object of the present invention is to provide a wire electrical discharge machine that achieves highly precise machining by eliminating an unevenly distributed state of machining chips in a machining gap between a wire electrode and a workpiece.

A wire electrical discharge machine according to the present invention machines a workpiece under conditions in which a wire electrode is stretched between an upper wire guide and a lower wire guide, a voltage is applied to a machining gap between the wire electrode and a workpiece so that an electrical discharge occurs, relative positions of the wire electrode with respect to the workpiece are changed, and a working fluid is being supplied to the machining gap from an upper working fluid feeder installed in the upper wire guide and a lower working fluid feeder installed in the lower wire guide. The wire electrical discharge machine comprises: a discharge pulse current discriminating unit that discriminates, with respect to a discharge pulse current introduced into the machining gap, between an effective discharge pulse contributing to machining of the workpiece and an ineffective discharge pulse not contributing to the machining of the workpiece; an ineffective discharge pulse number counting unit that counts the number of the ineffective discharge pulses that are discriminated every predetermined time; an electrical discharge position detecting unit that detects an electrical discharge position by measuring current values on a plurality of conduction paths provided in the machining gap every predetermined time and comparing the respective measured current values; a machining-chips unevenly distributed state discriminating unit that discriminates an unevenly distributed state of machining chips in the machining gap based on the counted number of the ineffective discharge pulses and the detected electrical discharge position; and a working-fluid flow-rate adjusting unit that adjusts balance between a flow rate or a pressure of the working fluid supplied from the upper working fluid feeder and a flow rate or a pressure of the working fluid supplied from the lower working fluid feeder based on the discriminated unevenly distributed state of the machining chips so that the unevenly distributed state of the machining chips is eliminated.

The discharge pulse current discriminating unit may discriminate, with respect to the discharge pulse current, between the effective discharge pulse and the ineffective discharge pulse by setting a threshold for a machining gap voltage or an application time of the machining gap voltage.

The machining-chips unevenly distributed state discriminating unit may discriminate a poor machining state when the number of the ineffective discharge pulses is greater than a reference value, and discriminates the unevenly distributed state of the machining chips based on the electrical discharge position that is input from the electrical discharge position detecting unit.

The working-fluid flow-rate adjusting unit may increase the flow rate of the working fluid supplied from the upper working fluid feeder when a position where the machining chips are unevenly distributed is nearer the upper wire guide and is above a midway point in a thickness direction of the workpiece, and may conversely increase the flow rate of the working fluid supplied from the lower working fluid feeder when the position where the machining chips are unevenly distributed is nearer the lower wire guide and is below the midway point in the thickness direction of the workpiece, so as to eliminate the unevenly distributed state of the machining chips in the machining gap that is discriminated by the machining-chips unevenly distributed state discriminating unit.

In accordance with the present invention, the unevenly distributed state of the machining chips in the machining gap between the wire electrode and the workpiece can be eliminated. Accordingly, the wire electrical discharge machine capable of achieving highly precise machining can be provided.

BRIEF DESCRIPTION OF THE DRAWING

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 2:
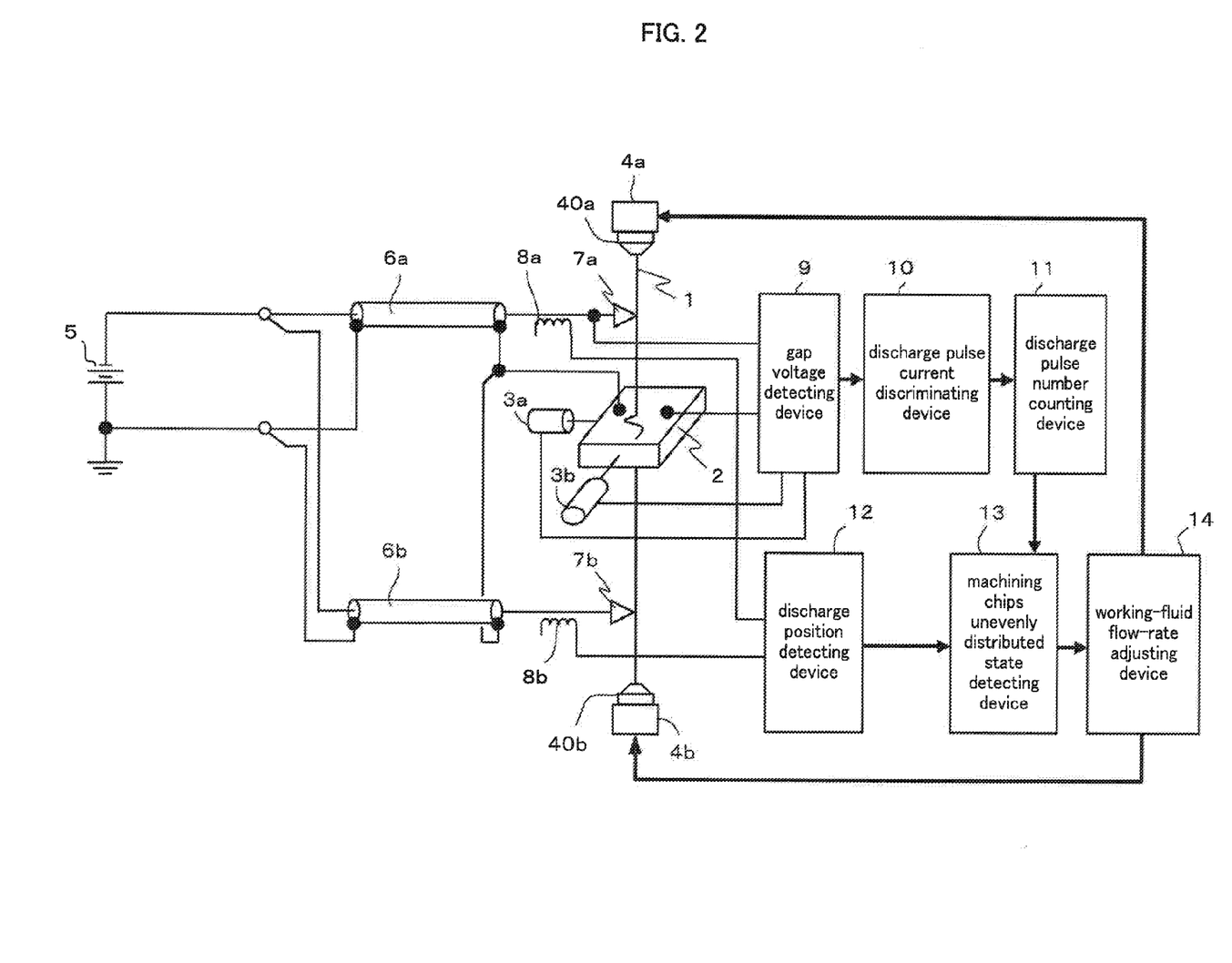
FIG. 2 is a schematic diagram illustrating an embodiment of a wire electrical discharge machine according to the present invention, especially for describing that the wire electrical discharge machine includes a machining-chips unevenly distributed state discriminating device which detects uneven distribution of machining chips in a machining gap, and a working-fluid flow-rate adjusting device which operates to eliminate the uneven distribution of the machining chips which is discriminated by the machining-chips unevenly distributed state discriminating device.

First of all, one embodiment of a wire electrical discharge machine according to the present invention is described by using FIG. 2.

A wire electrode 1 is stretched between an upper wire guide 4a and a lower wire guide 4b. The upper wide guide 4a includes a dice guide (not illustrated) that constrains displacement of the wire electrode 1, and an upper working fluid feeder (upper nozzle) 40a that ejects a working fluid during machining. Moreover, the lower wire guide 4b includes a dice guide (not illustrated) which constrains displacement of the wire electrode 1 and a lower working fluid feeder (lower nozzle) 40b that ejects the working fluid during the machining.

A machining power supply 5 is connected to each of an upper feeder line 6a and a lower feeder line 6b each being formed of a coaxial cable, respective one-side poles of the upper feeder line 6a and the lower feeder line 6b are connected to an upper feeder line 7a and a lower feeder line 7b, respectively which supply power to the wire electrode 1 in a sliding manner, and the other-side poles thereof are connected to the workpiece 2. With this configuration, a voltage can be applied to a machining gap between the wire electrode 1 and the workpiece 2 so that an electrical discharge occurs, and a discharge pulse current is supplied from the machining power supply 5.

A machining gap voltage detecting device 9 detects a voltage of the machining gap between the wire electrode 1 and the workpiece 2 and drives servo motors 3a and 3b such that the machining gap voltage is controlled to be kept constant. The servo motors 3a and 3b are driving units which move the workpiece 2 relative to the wire electrode 1. A discharge pulse current discriminating device 10 discriminates between a discharge pulse (effective discharge pulse) which causes a normal electrical discharge and thus greatly contributes to the machining of the workpiece 2, and a discharge pulse (ineffective discharge pulse) which is electrically discharged to the machining chips 20 (See FIG. 1) or to the workpiece 2 through the machining chips 20. A discharge pulse number counting device 11 counts the number of the ineffective discharge pulses discriminated every predetermined time. A discharge position detecting device 12 measures current values that respectively flow to the upper feeder line 6a and the lower feeder line 6b by using current sensors 8a and 8b, respectively every predetermined time, and detects an electrical discharge positions based on a difference between the measured current values.

A machining-chips unevenly distributed state discriminating device 13 discriminates a poor machining state due to a large amount of the machining chips 20 when the number of the ineffective discharge pulses counted by the discharge pulse number counting device 11 is increased, and discriminates the uneven distribution of the machining chips 20 from the electrical discharge positions obtained by the electrical discharge position detecting device 12. A working-fluid flow-rate adjusting device 14 adjusts balance between flow rates or pressures of working fluids which are supplied to a discharge machining portion respectively from the upper working fluid feeder 40a (upper nozzle) and the lower working fluid feeder 40b (lower nozzle) which are respectively provided in the upper wire guide 4a and the lower wire guide 4b such that the uneven distribution of the machining chips 20 discriminated by the machining-chips unevenly distributed state discriminating device 13 can be eliminated.

Figure 3A:
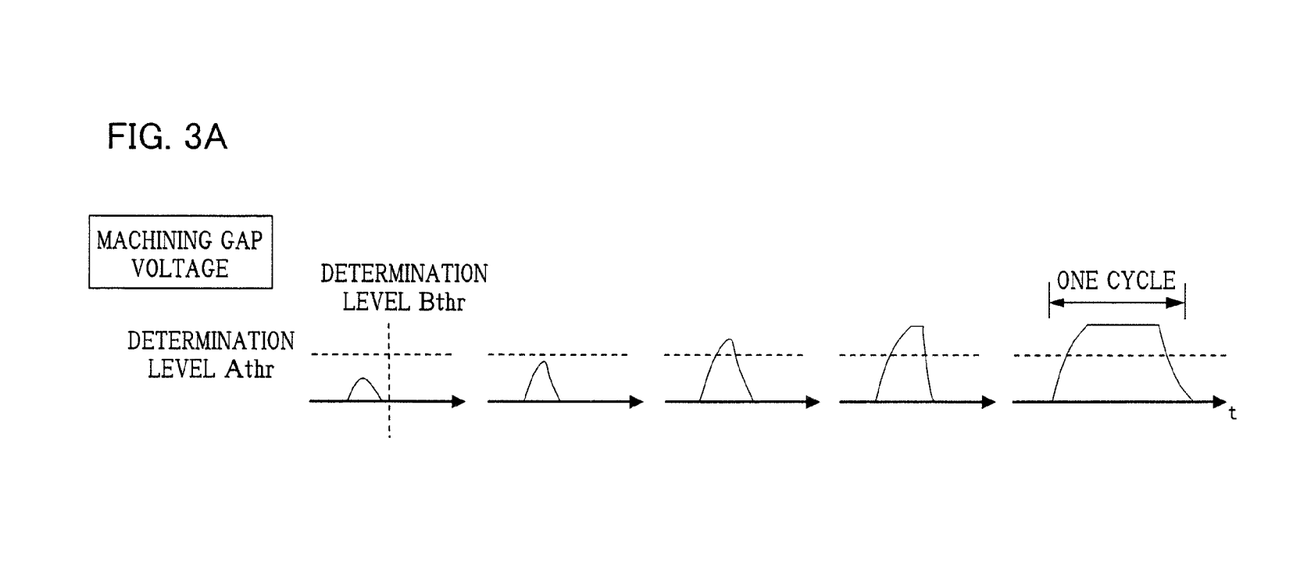
FIGS. 3A and 3B are diagrams for describing a method of discriminating a discharge pulse current.
Figure 3B:
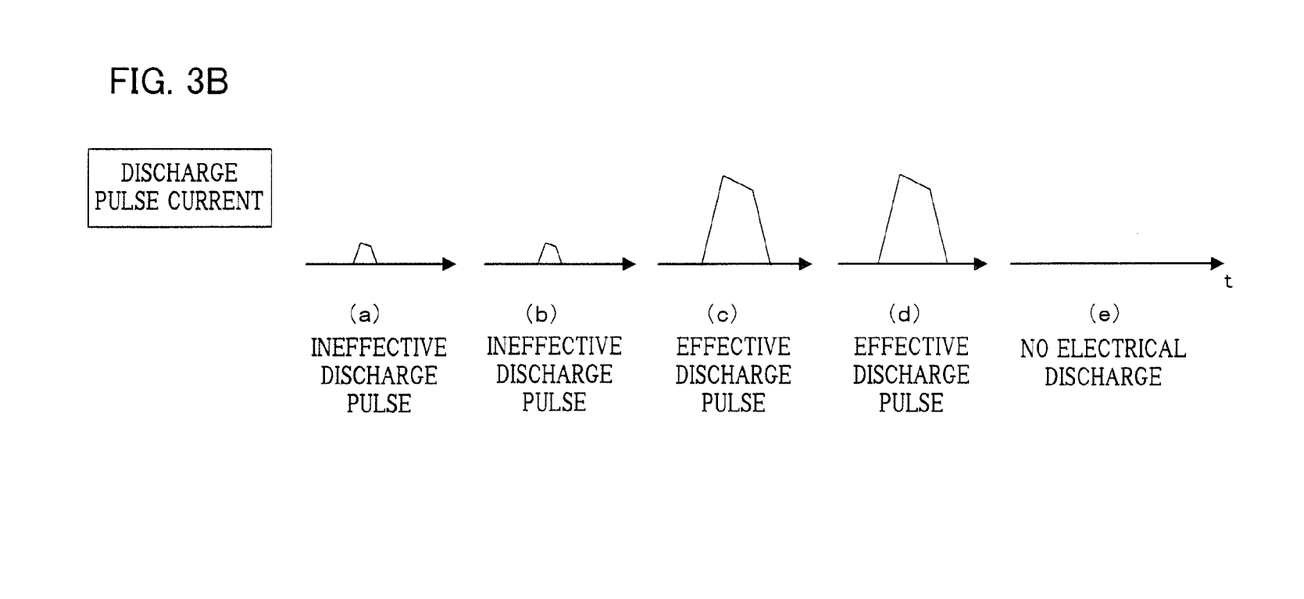

Next, a method of discriminating the discharge pulse current is described by using FIGS. 3A and 3B.

Since the wire electrical discharge machine performs electrical discharge machining by supplying the discharge pulse current while applying a voltage to the machining gap between wire electrode 1 and workpiece 2, the number of discharge pulses can be counted from the relationship between the machining gap voltage and the discharge pulse current (See the machining gap voltage detecting device 9, the discharge pulse current discriminating device 10, and the discharge pulse number counting device 11 of the wire electrical discharge machine of FIG. 2). The discharge pulse current can be classified into a discharge pulse that greatly contributes to the machining of the workpiece 2 (effective discharge pulse) and a discharge pulse discharged to the machining chips 20 or to the workpiece 2 through the machining chips 20 (ineffective discharge pulse).

Since the electrical discharge occurs in the middle stage while the machining gap voltage is rising (See (a) and (b) of FIG. 3B) when the machining chips 20 exist in the machining gap between the wire electrode 1 and the workpiece 2, the number of the ineffective discharge pulses can be counted by setting a threshold for the machining gap voltage or the application time of the machining gap voltage. The discharge pulse current which leads an electrical discharge in a state in which the machining gap voltage has not yet reached a determination level Athr is the ineffective discharge pulse (See (a) and (b) of FIG. 3B). On the other hand, the discharge pulse current which leads to a normal electrical discharge which occurs when the machining gap voltage has reached the determination level Athr is the effective discharge pulse (See (c) and (d) of FIG. 3B). Moreover, there may be cases that the electrical discharge does not occur within a cycle of application of the machining gap voltage even though the machining gap voltage has reached the determination level Athr (See (e) of FIG. 3B). Or, the number of the ineffective discharge pulses can be counted by setting a determination level Bthr for the application time of the machining gap voltage.

Here, it can be considered that as the larger the number of the ineffective discharge pulses discriminated by the discharge pulse current discriminating device 10 is, the larger the amount of the machining chips 20 is. Accordingly, the number of the ineffective discharge pulses can be used as an index that shows the quality of the machining state at the machining gap. Moreover, the electrical discharge position detecting device 12 detects current values that flow to respective conduction units (upper feeder 7b and lower feeder 7a) by using the current sensors 8a and 8b, respectively and detects the electrical discharge positions based on the detected current values that flow to the conduction units, respectively. And, the machining-chips unevenly distributed state discriminating device 13 can determine that the machining chips 20 exist at the electrical discharge positions at which the ineffective discharge pulses are generated, based on an output from the discharge pulse number counting device 11 and an output from the electrical discharge position detecting device 12. For instance, regarding this electrical discharge position detecting device 12, JP-A No. 1-121127 discloses a technology that detects the electrical discharge position where the ineffective discharge pulse flows, by measuring the current values on a plurality of conduction paths (the upper feeder 7b and the lower feeder 7a) installed in the machining gap between the wire electrode 1 and the workpiece 2.

From this point of view, when the number of the ineffective discharge pulses has increased, the working fluid is supplied to a part at which the machining chips 20 are unevenly distributed so that the machining chips 20 can be exhausted. In this way, the unevenly distributed state of the machining chips 20 can be eliminated. Specifically, when the electrical discharge position (position where the machining chips 20 are unevenly distributed) is relatively near the upper wire guide 4a (that is, when the electrical discharge position is near the upper wire guide and is above the midway point in the thickness direction of the workpiece 2), the flow rate of the working fluid from the upper working fluid feeder (upper nozzle) 40a is increased, and conversely when the electrical discharge position (the position where the machining chips 20 are unevenly distributed) is relatively near the lower wire guide (that is, when the electrical discharge position is near the lower wire guide and is below the midway point in the thickness direction of the workpiece 2), the flow rate of the working fluid from the lower working fluid feeder (lower nozzle) 40b is increased. In this way, the unevenly distributed state of the machining chips 20 can be eliminated. Moreover, the state in which the uneven distribution of the machining chips has been eliminated means a state in which the machining chips 20 remaining in the machining gap between the wire electrode 1 and the workpiece 2 in the traveling direction of the wire electrode 1 have been uniformly eliminated in the thickness direction of the workpiece 2.

As the method of adjusting the working fluid, a way of adjusting the pressure of the working fluid can be considered besides a way of adjusting the flow rate of the working fluid.

However, both have the same goal. For the adjustment of the working fluid, other ways may be also considered. For example, there is a way in which supply of the working fluid from any one of the upper and lower working fluid feeders 40*a* and 40*b* is stopped, or is performed at a constant rate while the flow rate of the working fluid supplied from the other feeder is variable. The amount of this adjustment may be flexibly determined such that the amount is changed in consideration of the machining result of the workpiece 2 or the generation state of the machining chips during the machining.

Alternatively, there may be a method of preventing the machining chips 20 from staying at a predetermined position by alternately repeating an ejection and a temporary suspension of the supply of the working fluid, an increase and a decrease of the flow rate of the working fluid, or an increase and a decrease of the pressure of the working fluid.

When the machined shape is complicated, the machining chips 20 might unevenly remain in accordance with the machined shape. In this case, the above-mentioned relation between the position where the machining chips 20 are unevenly distributed, and the increase/decrease of the working fluid is reversed. In other words, the flow rate of the working fluid supplied from the lower working fluid feeder (lower nozzle) 40*b* is increased when the electrical discharge position (position where the machining chips 20 are unevenly distributed) is nearer the upper wire guide 4*a* (when the electrical discharge position is near the upper wire guide and is above the midway point in the thickness direction of the workpiece 2), and conversely the flow rate of the working fluid supplied from the upper working fluid feeder (upper nozzle) 40*a* is increased when the electrical discharge position (position where the machining chips 20 are unevenly distributed) is nearer the lower wire guide 4*b* (when the electrical discharge position is near the lower wire guide and is below the midway point in the thickness direction of the workpiece 2). The machining chips 20 are prevented from staying at a predetermined position by increasing the flow rate of the working fluid on the side opposite the position where the machining chips 20 are unevenly distributed. In addition, since the flow of the working fluid can be formed outside the workpiece 2, the exhaust of the machining chips 20 can be promoted.

Therefore, by adjusting the flow rate of the working fluid based on the machining state, locally concentrated electrical discharge machining can be avoided and the size of the machining gap between the wire electrode 1 and the workpiece 2 can be kept uniform. In other words, highly precise machining can be achieved. Furthermore, since an appropriate adjustment of the flow rate of the working fluid can promote the exhaust of the machining chips existing in the machining gap between the wire electrode 1 and the workpiece 2, highly efficient machining can be achieved.

Figure 4:
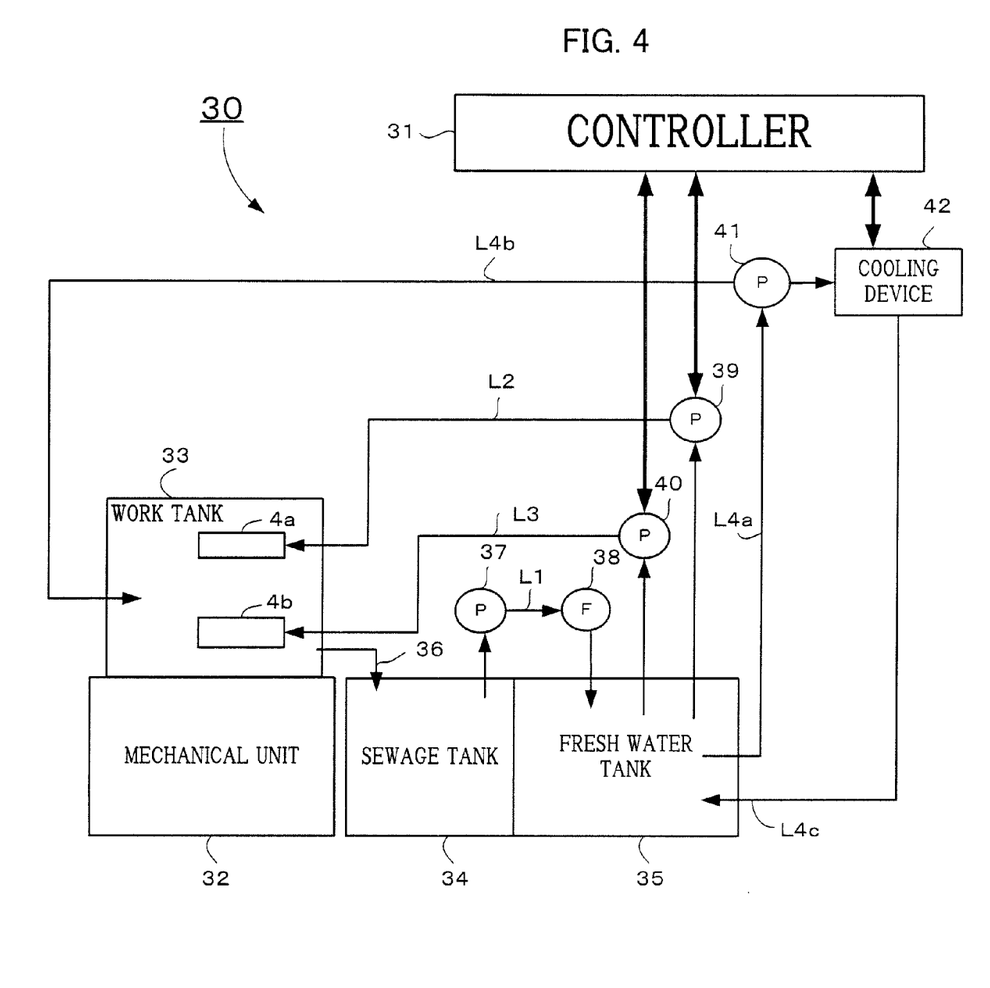
FIG. 4 is a diagram for describing an embodiment of a wire electrical discharge machine according to the present invention (in particular, for describing an operation of a pump which pumps up a working fluid from a fresh-water tank in accordance with an unevenly distributed state of the machining chips which is discriminated by the machining-chips unevenly distributed state discriminating device illustrated in FIG. 2).

One embodiment of a wire electrical discharge machine in accordance with the present invention is described by using FIG. 4.

A work tank 33 is installed in a mechanical unit 32 of a wire electrical discharge machine 30. An electrical discharge machining unit is installed in the work tank 33. The electrical discharge machining unit is structured such that a workpiece provided in the mechanical unit 32 is mounted and attached to a table. A workpiece 2 and a wire electrode 1 are moved relative to each other while a voltage is being applied between the workpiece 2 and the wire electrode 1 (See FIG. 2) to cause an electrical discharge. Under this condition, the electrical discharge machining is performed on the workpiece 2.

An upper working fluid feeder (upper nozzle) 40*a* is installed in an upper wire guide 4*a*, and a lower working fluid feeder (lower nozzle) 40*b* is installed in a lower wire guide 4*b*. And, a working fluid pumped up from a fresh water tank 35 with use of a pump 39 is supplied and jet to the upper working fluid feeder (upper nozzle) 40*a* via a piping L2. Moreover, the working fluid pumped up from the fresh water tank 35 with use of the pump 40 is supplied and jet to the lower working fluid feeder (lower nozzle) 40*b* via a piping L3.

A function to control a working fluid supply operation with use of the pump 39 and a pump 40 is also provided so that the working fluid can be supplied, always at a steady flow rate, to an electrical discharge machining operation portion between the workpiece 2 and the wire electrode 1. In one embodiment of the wire electrical discharge machine according to the present invention, in order to eliminate an unevenly distributed state of machining chips 20, a supply operation of the working fluids supplied form the upper working fluid feeder (upper nozzle) 40*a* and the lower working fluid feeder (lower nozzle) 40*b* is controlled. For such control, pressure sensors or flowmeters are provided on respective supply paths. That is, for the working fluid supplied from the upper working fluid feeder (upper nozzle) 40*a*, a pressure sensor for detecting a pressure of the working fluid or a flowmeter (not illustrated) for detecting a flow rate of the working fluid is installed. Furthermore, for the working fluid supplied from the lower working fluid feeder (lower nozzle) 40*b*, a pressure sensor for detecting a fluid pressure of the working fluid or a flowmeter (not illustrated) for detecting a flow rate of the working fluid is installed. A controller 31 performs feedback control based on the obtained physical quantity such as the pressure or the flow rate, and controls the supply of the working fluid. And, the pumps 39 and 40 are driven in accordance with the unevenly distributed state of the machining chips 20 discriminated by the machining-chips unevenly distributed state discriminating device 13 (See FIG. 2).

The working fluid is supplied to and reserved in the work tank 33. The working fluid is mixed with the machining chips generated due to the electrical discharges in the work tank 33, and the working fluid flows out to a sewage tank 34 as indicated by a reference numeral 36. The working fluid which is collected and thus reserved in the sewage tank 34 is pumped up by a filter pump 37 and is then forced to pass through a filter 38 so as to be filtered. As a result, the machining chips are removed from the working fluid, and then the working fluid is supplied to the fresh water tank 35. A cooling device 42 receives an instruction signal from the controller 31 of the wire electrical discharge machine 30, cools the working fluid pumped up by the pump 41 in accordance with the instruction, and returns the working fluid to the fresh water tank 35 through a working fluid feedback loop L4*c*. Moreover, a portion of the working fluid pumped up from the fresh water tank 35 by the pump 41 is supplied to the work tank 33 to keep the temperature of the working fluid in the work tank 33 constant.

The invention claimed is:

1. A wire electrical discharge machine that machines a workpiece under conditions in which a wire electrode is stretched between an upper wire guide and a lower wire guide, a voltage is applied to a machining gap between the wire electrode and a workpiece so that an electrical discharge occurs, relative positions of the wire electrode with respect to the workpiece are changed, and a working fluid is being supplied to the machining gap from an upper working fluid feeder installed in the upper wire guide and a lower working fluid feeder installed in the lower wire guide, the wire electrical discharge machine comprising:

a discharge pulse current discriminating unit that discriminates, with respect to a discharge pulse current introduced into the machining gap, between an effective discharge pulse contributing to machining of the workpiece and an ineffective discharge pulse not contributing to the machining of the workpiece;

an ineffective discharge pulse number counting unit that counts the number of the ineffective discharge pulses that are discriminated every predetermined time;

an electrical discharge position detecting unit that detects an electrical discharge position by measuring current values on a plurality of conduction paths provided in the machining gap every predetermined time and comparing the respective measured current values;

a machining-chips unevenly distributed state discriminating unit that discriminates an unevenly distributed state of machining chips in the machining gap based on the counted number of the ineffective discharge pulses and the detected electrical discharge position; and a working-fluid flow-rate adjusting unit that adjusts balance between a flow rate or a pressure of the working fluid supplied from the upper working fluid feeder and a flow rate or a pressure of the working fluid supplied from the lower working fluid feeder based on the discriminated unevenly distributed state of the machining chips so that the unevenly distributed state of the machining chips is eliminated.

2. The wire electrical discharge machine according to claim 1, wherein the discharge pulse current discriminating unit discriminates, with respect to the discharge pulse current, between the effective discharge pulse and the ineffective discharge pulse by setting a threshold for a machining gap voltage or an application time of the machining gap voltage.

3. The wire electrical discharge machine according to claim 1, wherein the machining-chips unevenly distributed state discriminating unit discriminates a poor machining state when the number of the ineffective discharge pulses is greater than a reference value, and discriminates the unevenly distributed state of the machining chips based on the electrical discharge position that is input from the electrical discharge position detecting unit.

4. The wire electrical discharge machine according to claim 1, wherein the working-fluid flow-rate adjusting unit increases the flow rate of the working fluid supplied from the upper working fluid feeder when a position where the machining chips are unevenly distributed is nearer the upper wire guide and is above a midway point in a thickness direction of the workpiece, and conversely increases the flow rate of the working fluid supplied from the lower working fluid feeder when the position where the machining chips are unevenly distributed is nearer the lower wire guide and is below the midway point in the thickness direction of the workpiece, so as to eliminate the unevenly distributed state of the machining chips in the machining gap that is discriminated by the machining-chips unevenly distributed state discriminating unit.

* * * * *